US012284471B2

(12) United States Patent
Braun et al.

(10) Patent No.: US 12,284,471 B2
(45) Date of Patent: Apr. 22, 2025

(54) PORTABLE SPEAKER WITH LIGHT REFLECTOR

(71) Applicant: Rivian IP Holdings, LLC, Plymouth, MI (US)

(72) Inventors: Matthew Braun, Ann Arbor, MI (US); Jonathan Salerno, Newport, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/639,696

(22) PCT Filed: Sep. 3, 2021

(86) PCT No.: PCT/US2021/048990

§ 371 (c)(1),
(2) Date: Mar. 2, 2022

(87) PCT Pub. No.: WO2022/132250

PCT Pub. Date: Jun. 23, 2022

(65) Prior Publication Data

US 2024/0114274 A1 Apr. 4, 2024

Related U.S. Application Data

(60) Provisional application No. 63/128,003, filed on Dec. 18, 2020.

(51) Int. Cl.

| | |
|---|---|
| ***H04R 1/02*** | (2006.01) |
| ***F21V 7/00*** | (2006.01) |
| ***F21V 33/00*** | (2006.01) |

(52) U.S. Cl.

CPC ........... *H04R 1/028* (2013.01); *F21V 7/0075* (2013.01); *F21V 33/0056* (2013.01); *H04R 1/025* (2013.01); *H04R 2499/11* (2013.01); *H04R 2499/13* (2013.01)

(58) Field of Classification Search

CPC .... H04R 1/028; H04R 1/025; H04R 2499/11; H04R 2499/13; F21V 7/0075; F21V 33/0056

USPC .......................................................... 381/332

See application file for complete search history.

(56) References Cited

U.S. PATENT DOCUMENTS

| | | | | |
|---|---|---|---|---|
| 9,939,146 | B1 * | 4/2018 | Palusky | F21V 33/0056 |
| 2007/0222631 | A1 | 9/2007 | Haase | |
| 2017/0105069 | A1 * | 4/2017 | Mezzomo | H04R 1/026 |

FOREIGN PATENT DOCUMENTS

| | | | | |
|---|---|---|---|---|
| CN | 205946066 | * | 2/2017 | H04R 1/02 |
| CN | 205946066 U | | 2/2017 | |

OTHER PUBLICATIONS

Nov. 30, 2021 International Search Report and Written Opinion for International Patent Application No. PCT/US2021/48990.

* cited by examiner

*Primary Examiner* — Vivian C Chin
*Assistant Examiner* — Douglas J Suthers
(74) *Attorney, Agent, or Firm* — Patterson + Sheridan, LLP

(57) ABSTRACT

A portable speaker is disclosed. The portable speaker includes a speaker, a light source, and a reflector. The speaker is adapted to produce sound. The light source is adapted to emit light. The reflector is adapted to redirect at least a portion of the light to illuminate one or more ground surfaces.

18 Claims, 8 Drawing Sheets

PORTABLE SPEAKER WITH LIGHT REFLECTOR

CROSS-REFERENCE TO RELATED APPLICATION

The present disclosure claims the benefit of priority of co-pending International Application No. PCT/US21/48990, filed on Sep. 3, 2021, and entitled "PORTABLE SPEAKER APPARATUS," which claims priority to U.S. Provisional Patent Application 63/128,003, filed on Dec. 18, 2020, and entitled "PORTABLE SPEAKER APPARATUS," the contents of which are incorporated in full by reference herein.

INTRODUCTION

The present disclosure relates to portable sound systems. The statements in this section merely provide background information related to the present disclosure and may not constitute prior art.

When arriving at an adventure destination or other destination, particularly when arriving late, people may have to search for a source for light and a source for music to use while, for example, setting up a campsite or while performing other actions. These items may be packed with other items and may not always be easily accessible.

The present background is provided by way of illustrative environmental context only. It will be readily apparent to those of ordinary skill in the art that the principles of the present disclosure may be implemented in other environmental contexts equally.

BRIEF SUMMARY

Various disclosed embodiments include illustrative portable speakers and vehicles.

In an illustrative embodiment of the present disclosure, a portable speaker is disclosed. The portable speaker includes a speaker, a light source, and a reflector. The speaker is adapted to produce sound. The light source is adapted to emit light. The reflector is adapted to redirect at least a portion of the light to illuminate one or more ground surfaces.

In another illustrative embodiment of the present disclosure, a portable speaker is disclosed. The portable speaker includes a latch, a speaker, a light source, and a reflector. The latch is adapted to secure a frame of the portable speaker to a vehicle. The speaker is adapted to produce sound. The light source is adapted to emit light. The reflector is adapted to redirect at least a portion of the light to illuminate one or more ground surfaces.

In a further illustrative embodiment of the present disclosure, a vehicle is disclosed. The vehicle includes a vehicle body, a vehicle cabin, a portable speaker, and a dock. The portable speaker includes a latch, a speaker, a light source, and a reflector. The latch is adapted to secure a frame of the portable speaker to a vehicle. The speaker is adapted to produce sound. The light source is adapted to emit light. The reflector is adapted to redirect at least a portion of the light to illuminate one or more ground surfaces. The dock is disposed in a location chosen from the vehicle body and the vehicle cabin. The dock is adapted to receive the portable speaker therein and secure the portable speaker thereto via the latch.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Figure 1:
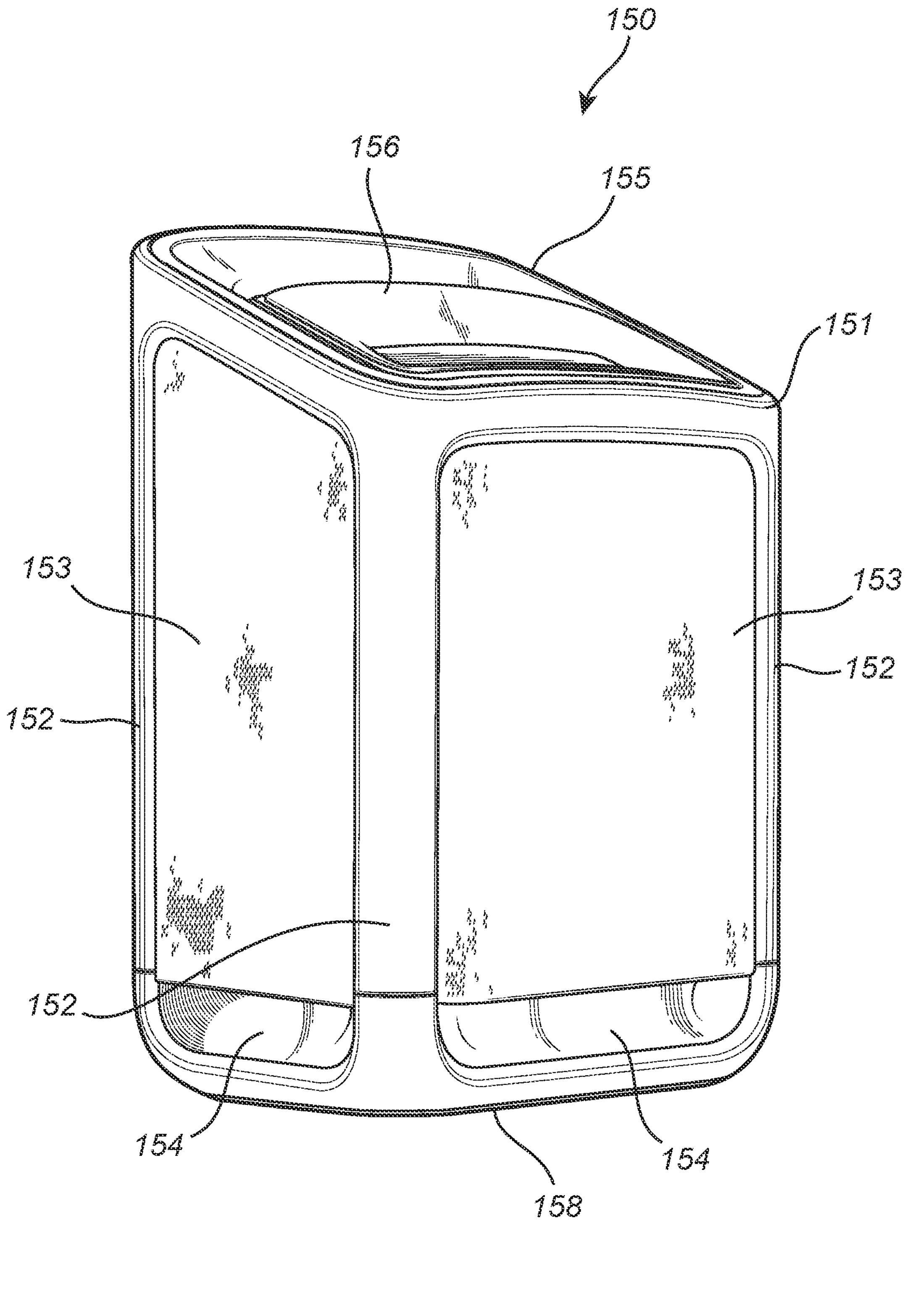
FIG. 1 is a front perspective view of an illustrative portable speaker.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Given by way of non-limiting overview, various disclosed embodiments include illustrative portable speakers and vehicles. Given by way of non-limiting example provided by way of illustration only, the present disclosure provides, among other illustrative embodiments, a portable speaker that is adapted to anchor in a dock of a vehicle and that is adapted to diffuse light to illuminate the environment surrounding the portable speaker—similar to a manner in which a lantern diffuses light. In various embodiments, one or more light sources emit light that is redirected outward by one or more reflectors to diffuse the light. With use of the one or more reflectors, the one or more light sources can be positioned discreetly in the portable speaker, such as underneath the speaker grilles, while still providing sufficient light to illuminate the environment around the portable speaker.

Referring now to FIGS. 1-5 and 7, an illustrative portable speaker 150 includes a frame 151, a speaker 188 (FIG. 7), a light source 163 (FIG. 5), and at least one reflector 154. The frame 151 includes a cap (top portion) 155 and a foot (bottom portion) 158. The cap 155 includes a handle 156. The foot 158 is distal to the cap 155 and is adapted to support the frame 151. The speaker 188 is adapted to produce sound. The light source 163 is adapted to emit light in a direction away from the cap 155 and towards the foot 158. The reflector 154 is positioned between the foot 158 and the light source 163. The reflector 154 is adapted to redirect the light outward therefrom.

As shown in FIG. 1, in various embodiments the frame 151 includes the cap 155 and the foot 158 that is distal to the cap 155. The cap 155 includes the handle 156. The handle 156 is adapted for holding and carrying the portable speaker 150. In various embodiments, the handle 156 is embedded in the cap 155. In other various embodiments, the handle 156 extends upwardly from a remainder of the cap 155.

Figure 3:
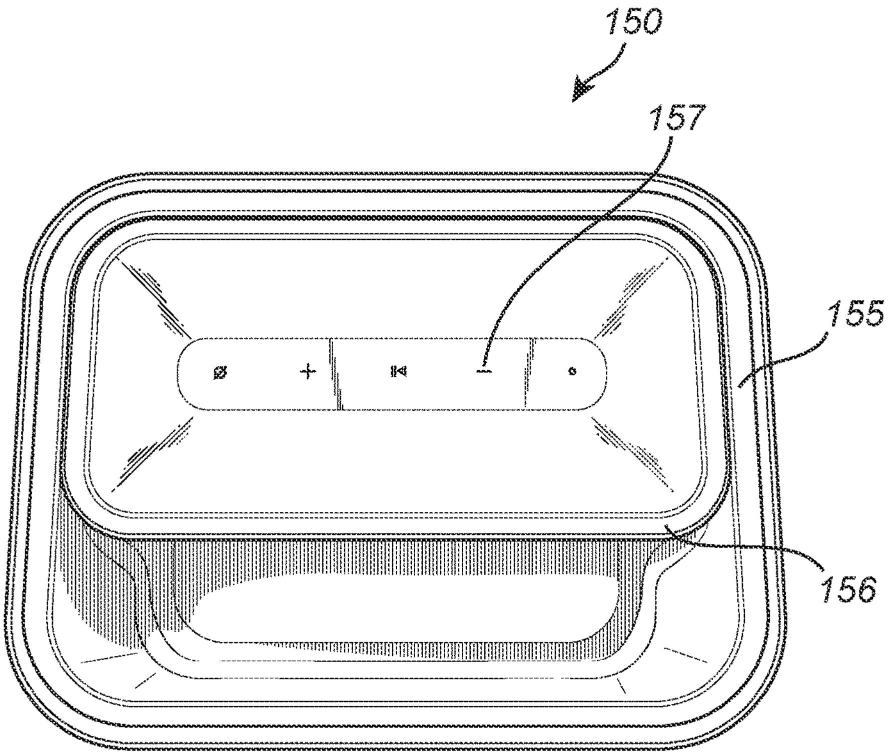
FIG. 3 is a top view of the portable speaker of FIG. 1.

As shown in FIG. 3, in various embodiments the cap 155 includes speaker controls 157 configured to control various aspects of the portable speaker, such as playing music, changing music tracks, wirelessly communicating control functions including device synchronization, and the like. In various embodiments, the speaker controls 157 include sensors, icons, backlights, and the like for illustrating a function and for detecting a selection thereof.

Figure 4:
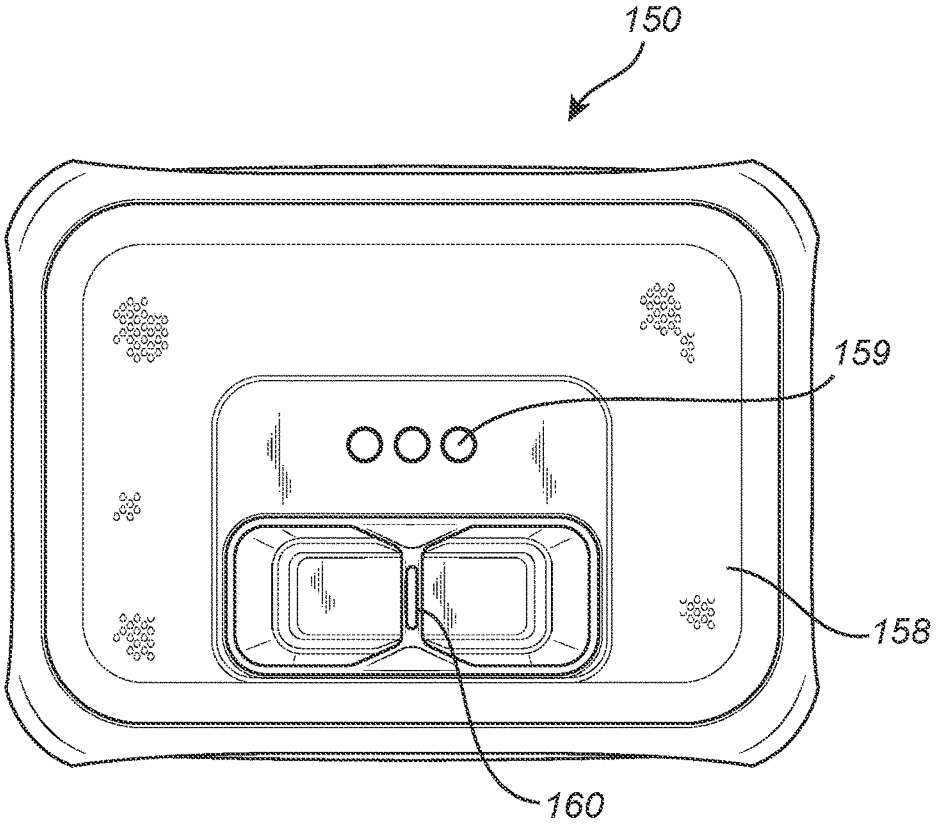
FIG. 4 is a bottom view of the portable speaker of FIG. 1.

As shown in FIG. 4, in various embodiments the foot 158 is a base of the portable speaker 150 and is adapted to support the portable speaker 150 in a predetermined orientation while resting on a surface, such as an upright orientation with the cap 155 above the foot 158 (as shown in FIG. 1). In various embodiments, the foot 158 includes a latch 160. The latch 160 suitably is part of a fastening mechanism adapted to secure the frame 151 to a vehicle, such as within a dock thereof. In various embodiments, the latch 160 is also adapted to connect to latching devices, such as carabiners, clips, and other mechanism used for connecting components, including camping equipment, together for hanging the portable speaker 150. In various embodiments, if desired another latch 160 may be included in the cap 155 and may be adapted for hanging the portable speaker 150. In various embodiments, the latch 160 is configured to secure the portable speaker 150 within a vehicle, such as within the cabin of the vehicle. As such, the latch 160 is configured to secure the portable speaker 150 and ensure the portable speaker 150 is remains secured regardless of vehicle movements (e.g., acceleration, deceleration, sudden stops, sudden movements from collisions, sudden turns, vertical and/or horizontal movements, etc.) and vehicle orientations (e.g., rotated positions, tilted positions, other positions resulting from rock crawling, positions resulting from a rollover, and the like).

In various embodiments, the foot 158 includes electrical contacts 159 (FIGS. 4 and 5) that are adapted to receive electricity from a vehicle for charging a battery (not shown) of the portable speaker 150. In various embodiments, the electrical contacts 159 are further configured to facilitate communication between the portable speaker 150 and a controller of the vehicle, such as a sound system controller or the like.

Figure 5:
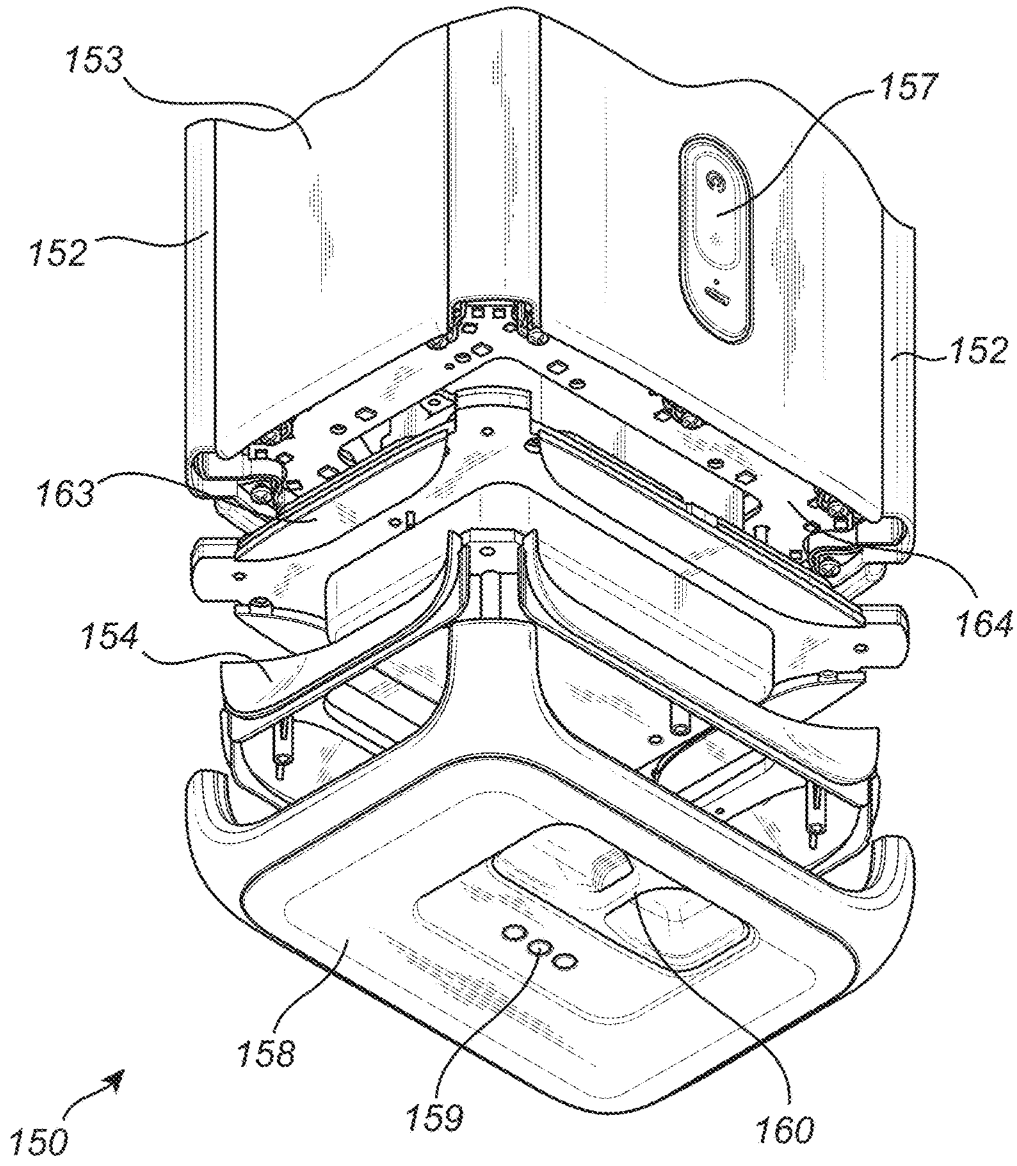
FIG. 5 is an exploded view of a foot of an illustrative portable speaker.

As shown in FIG. 5, in various embodiments each light source 163 is adapted to emit light in a direction away from the cap 155 and towards the foot 158. In various embodiments, each side (that is, front, back, and lateral sides) includes a light source 163. In various embodiments, each light source 163 includes an aperture adapted to focus the light towards the reflector 154. In various embodiments, each light source 163 includes without limitation one or more light-emitting diodes (LEDs) adapted to emit light in the direction towards the foot 158.

As shown in FIGS. 1-5, in various embodiments each reflector 154 is positioned between the foot 158 and the light source 163, and each reflector 154 is adapted to redirect the light outward therefrom and outward from the portable speaker 150. In various embodiments, each reflector 154 is adapted to redirect at least some of the light towards the ground while the portable speaker 150 is in the predetermined orientation of the frame 151 with the foot 158 resting on a surface. In various embodiments, the light source 163 and reflector 154 are adapted to diffuse the light to an area surrounding the frame 151 and surrounding the portable speaker 150. It will be appreciated that, by diffusing light to the area surrounding the portable speaker 150, the portable speaker 150 can help contribute to illuminating an area around a user similar to a lantern or the like.

In various embodiments, the frame 151 includes pillars 152 (FIGS. 1, 2, and 5) that extend between the cap 155 and the foot 158. In various embodiments, the pillars 152 connect the cap 155 to the foot 158. It will be appreciated that, in various embodiments, the pillars 152, along with the cap 155 and the foot 158, define a general shape and structure of the frame 151 and the portable speaker 150. In various embodiments and as shown in FIG. 5, each light source 163 and each reflector 154 extends across a side of the portable speaker 150 between two of the pillars 152.

Figure 2:
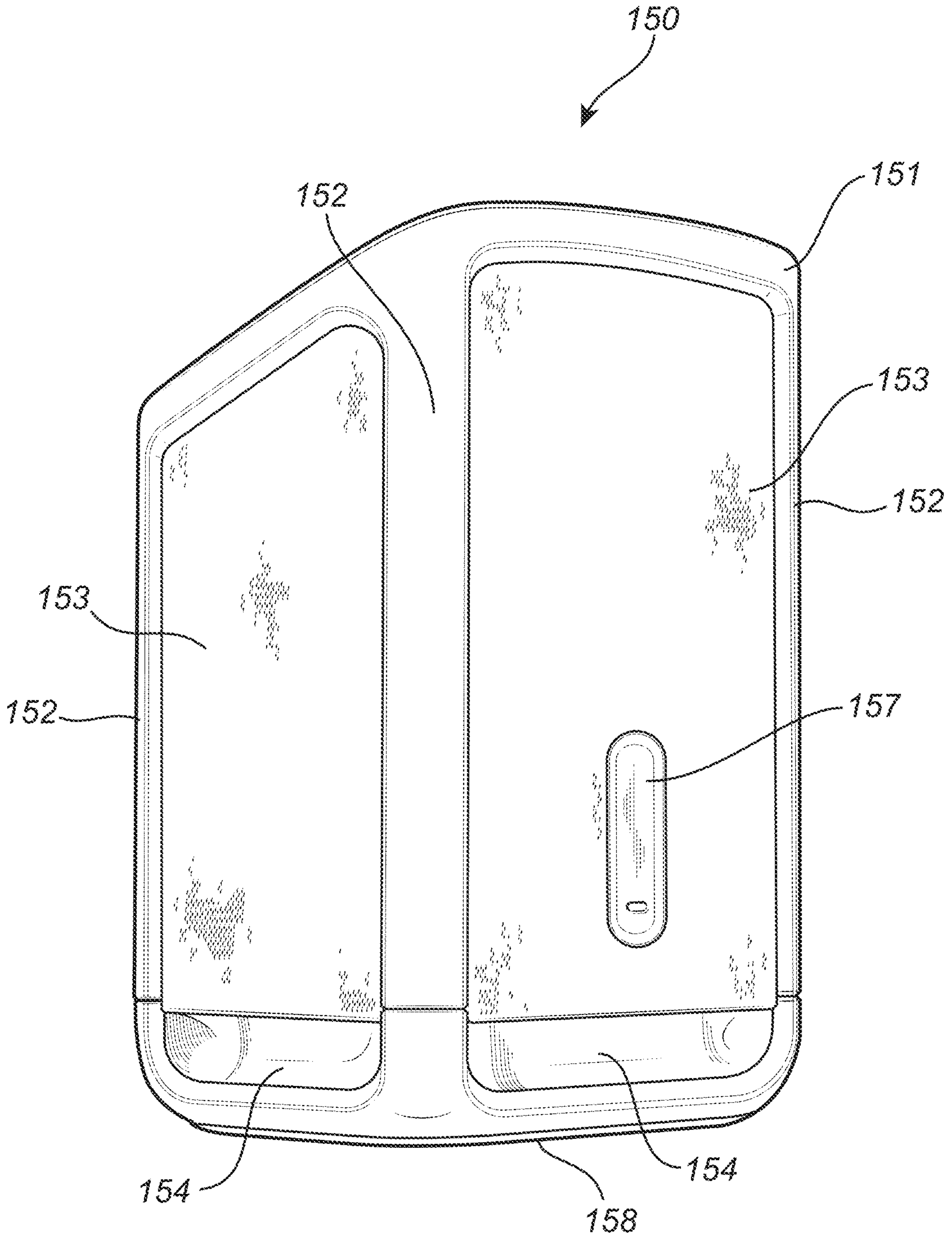
FIG. 2 is a rear perspective view of a back of the portable speaker of FIG. 1.
Figure 7:
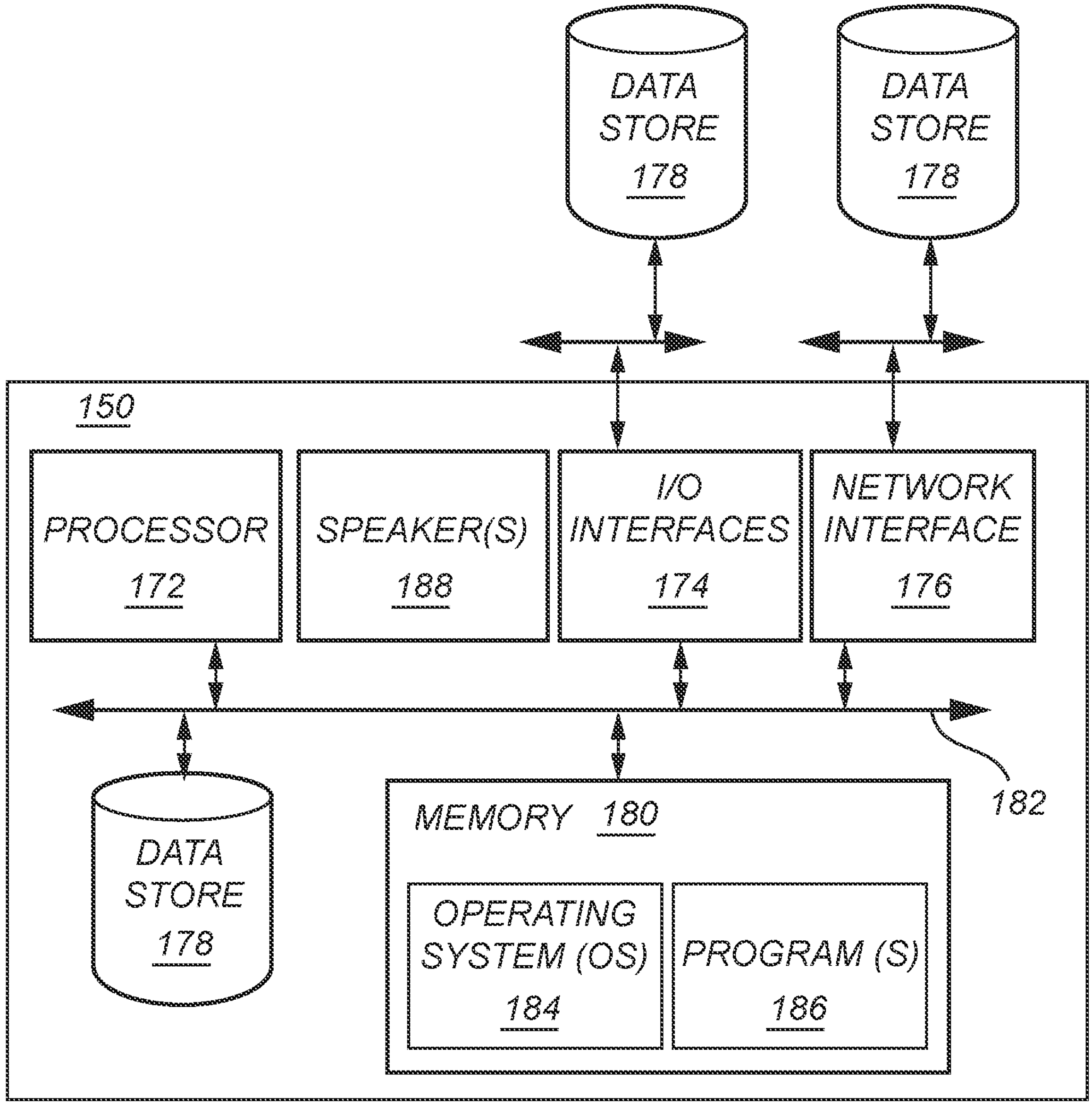
FIG. 7 is a block diagram of an illustrative portable speaker.

In various embodiments, the portable speaker 150 includes one or more speaker grilles 153 (FIGS. 1, 2, and 5). In various embodiments, the speaker grilles 153 may be formed of an acoustically transparent material such as, without limitation, a suitable cloth material or suitable foam material or the like and are inset relative to the pillars 152 positioned on each side thereof. In various embodiments, each side of the portable speaker 150 includes a speaker grille 153 that is positioned over one or more speakers 188 (FIG. 7).

Figure 6:
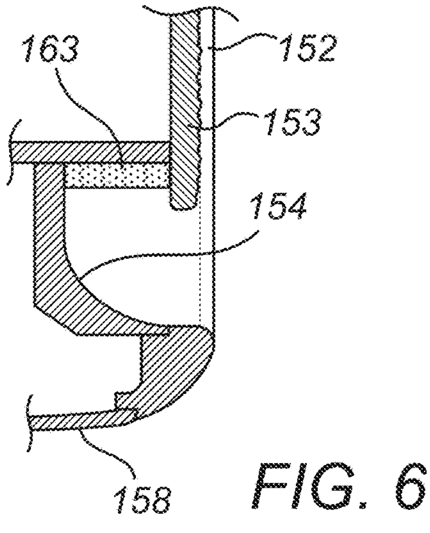
FIG. 6 is a cross-sectional view of an illumination arrangement of an illustrative embodiment of a portable speaker.

Referring additionally to FIG. 6, in various embodiments the light source 163 for each respective side of the portable speaker 150 is positioned under the respective speaker grille 153, such as under an end of the speaker grille 153 closest to the foot 158. In some such embodiments, each respective reflector 154 is positioned adjacent to the respective speaker grille 153 between the end of the speaker grille 153 and the foot 158.

As shown in FIG. 6, in various embodiments each reflector 154 includes a contoured surface, such as a concave surface, with an end closest to the respective light source 163 positioned inward from an end furthest from the respective light source 163.

In various embodiments, the portable speaker 150 is configured to synchronize the light emitted by the one or more light sources 163 and the sound emitted by the speakers 188. For example and given by way of illustration only and not of limitation, in some embodiments the portable speaker 150 may be configured to emit light replicating the ambiance of a fire while emitting sounds associated with a fire. As another example and given by way of illustration only and not of limitation, in some other embodiments the portable speaker 150 may be configured to emit light replicating the ambiance of ocean or other open-water surf while emitting sounds associated with ocean or other open-water surf. It will be appreciated that replication of other light and sound combinations is also contemplated. Further, in some embodiments, the one or more light sources 150 are controlled based on the sounds emanating from the speakers 188, such as, for example and without limitation, based on music being played by the portable speaker 150.

As shown in FIG. 7, in various embodiments the portable speaker 150 includes a digital computer that, in terms of hardware architecture, generally includes a processor 172, input/output (I/O) interfaces 174, a network interface 176, a data store 178, memory 180, and at least one of the speakers 188 that are adapted to produce sound. It will be appreciated that FIG. 7 depicts the portable speaker 150 in an oversimplified manner, and a practical embodiment may include additional components and suitably configured processing logic to support known or conventional operating features for portable speakers 150 that are not described in detail herein.

As shown in FIG. 7, a processor 172, I/O interfaces 174, a network interface 176, a data store 178, memory 180, and at least one speaker 188 are communicatively coupled via a local interface 182. The local interface 182 may include, for example without limitation, one or more buses or other wired or wireless connections, as is known in the art. The local interface 182 may have additional elements, which are omitted for purposes of simplicity and clarity, such as without limitation controllers, buffers (caches), drivers, repeaters, and receivers, among others, to enable communications. Further, the local interface 182 may include address, control, and/or data connections to enable appropriate communications among the aforementioned components.

In various embodiments the processor 172 may include a suitable hardware device for executing software instructions. The processor 172 may include any custom made or commercially available processor, a central processing unit (CPU), an auxiliary processor among several processors associated with the portable speaker 150, a semiconductor-based microprocessor (in the form of a microchip or chipset), a field-programmable gate array (FPGA), or generally any device for executing software instructions.

When the portable speaker 150 is in operation, the processor 172 is configured to execute software (that is, computer-executable instructions) stored within the memory 180 (that is, non-transitory computer-readable media), to communicate data to and from the memory 180, and to generally control operations of the portable speaker 150 pursuant to the software instructions.

The I/O interfaces 174 may be used to receive user input from and/or for providing system output to one or more devices or components including the speakers 188 and the one or more light sources 163. The user input may be provided via, for example, a controller, an application running on a user device, and the speaker controls 157. In various embodiments, the I/O interfaces 174 may include, for example and without limitation, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, a universal serial bus (USB) interface, and/or the like.

In various embodiments the network interface 176 may be used to enable the portable speaker 150 to communicate on a network, such as the Internet, or directly with another device, such as over short-range wireless interconnection (such as, for example, Bluetooth or the like). The network interface 176 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 176 may include address, control, and/or data connections to enable appropriate communications on the network.

In various embodiments a data store 178 may be used to store data. The data store 178 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 178 may incorporate electronic, magnetic, optical, and/or other types of storage media. In some embodiments, the data store 178 may be located internal to the portable speaker 150, such as, for example, an internal hard drive connected to the local interface 182 in the portable speaker 150. Additionally, in some other embodiments, the data store 178 may be located external to the portable speaker 150 such as, for example, an external hard drive connected to the I/O interfaces 174 (such as, for example, SCSI, or USB connection, or the like).

In various embodiments the memory 180 may include any suitable volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 180 may incorporate electronic, magnetic, optical, and/or other types of storage media. It will be appreciated that the memory 180 may have a distributed architecture, where various components are situated remotely from one another, but can be accessed by the processor 172.

It will be appreciated that the software in the memory 180 may include one or more software programs, each of which includes an ordered listing of executable instructions for implementing logical functions. For example, the software in the memory 180 suitably may include a suitable operating system (O/S) 184 and one or more programs 186. The operating system 184 controls the execution of other computer programs, such as the one or more programs 186, and provides scheduling, input-output control, file and data management, memory management, and communication control and related services. The one or more programs 186 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 8:
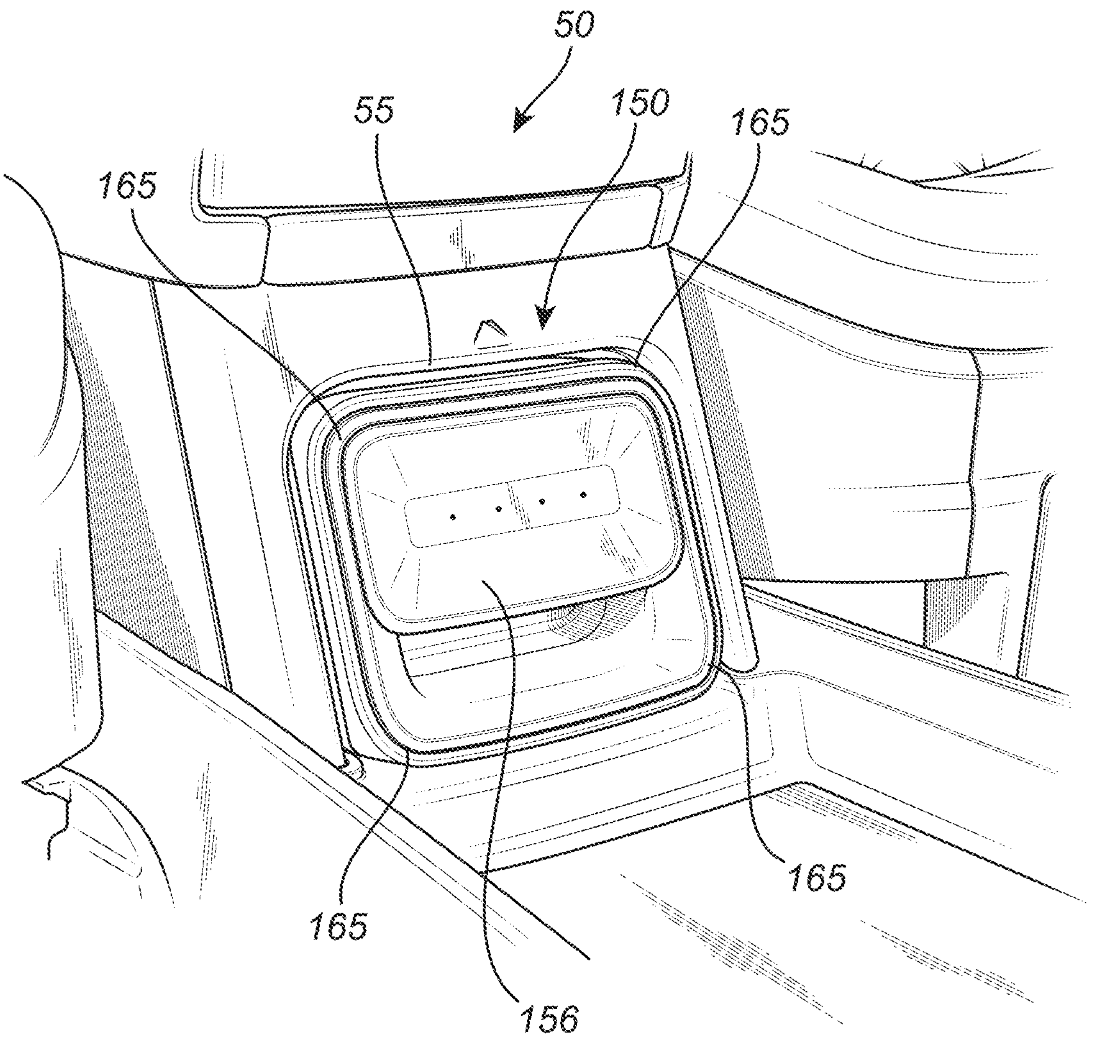
FIG. 8 is a perspective view of an illustrative vehicle console.

Referring additionally to FIG. 8, a vehicle console 50 includes a dock 55 that is adapted to receive the portable speaker 150 therein and to secure the portable speaker 150 thereto via the latch 160.

In various embodiments, the corners 165 of the portable speaker 150, such as those formed on the pillars 152, are shaped to help ensure that only a predetermined orientation of the frame 151 may be possible while inserting the frame 151 into the dock 55. In various embodiments, if desired the dock 55 may be shaped to help contribute to ensuring proper orientation of the portable speaker 150. For example, in various embodiments the pillars 152 at a back of the portable speaker 150 have a taller edge than the pillars 152 at a front of the portable speaker 150 to ensure that the rotation orientation of the portable speaker 150 is correct upon insertion into the dock 55, which can ensure that the latch 160 is properly positioned and oriented for connecting to the dock 55.

Furthermore, the combination of the position and orientation of the portable speaker 150 along with the connection to the latch 160 can help contribute to ensuring a proper connection between the electrical contacts 159 and the dock 55 for proper charging of the portable speaker 150.

While the dock 55 as shown in FIG. 8 is positioned in the vehicle console 50, it will be appreciated that, in various embodiments, the dock 55 may be positioned in other locations of a vehicle, such as in a door, under a seat, in or adjacent to a storage compartment, a trunk, exterior the cabin and on an exterior portion of the body of the vehicle, and the like.

Figure 9:
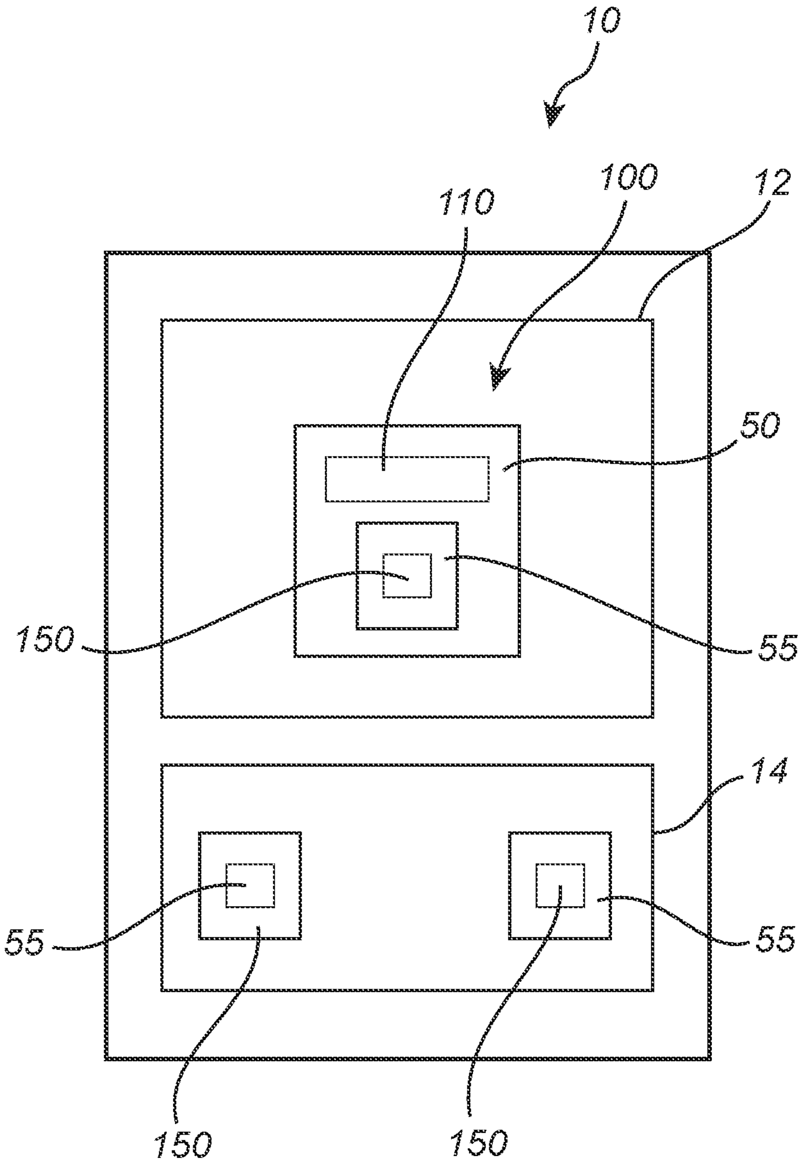
FIG. 9 is a schematic illustration of an illustrative vehicle including a sound system.

Referring additionally to FIG. 9, in various embodiments the vehicle 10 includes a vehicle cab 12, a vehicle frame 14, and a sound system 100. In various embodiments, the sound system 100 includes a controller 110 and one or more portable speakers 150. In various embodiments, the controller 110 is embedded in the vehicle console 50, which is positioned within the vehicle cab 12, and is adapted to control the audio provided by the vehicle 10. In various embodiments, the sound system 100 is a combination of portable speakers 150 and permanent speakers. In various embodiments, each of the docks 55 is disposed in locations such as the vehicle body and/or the vehicle cabin. In various embodiments, the dock 55 for each of the portable speakers 150 is adapted to direct the sound from the portable speakers 150 into the cab of the vehicle.

In various embodiments, the portable speaker 150 is configured to automatically connect to the controller 110 upon being received in the dock 55. In various embodiments, the portable speaker 150 is adapted to automatically disconnect from the controller 110 and connect to a user device upon being removed from the dock 55. In various embodiments, the portable speaker 150 is configured to associate with the vehicle and/or other speakers/portable speakers associated with the vehicle and is configured to synchronize sounds from the speaker 188 and/or light emitting from the light source 163 with sounds produced and lights emitted from the other speakers.

In various embodiments, the controller 110 is configured to synchronize the sound produced by the portable speaker 150 with other speakers (such as other portable speakers 150 or permanent speakers of the vehicle 10) within the vehicle 10 while the portable speaker 150 is secured in the dock 55.

Figure 10:
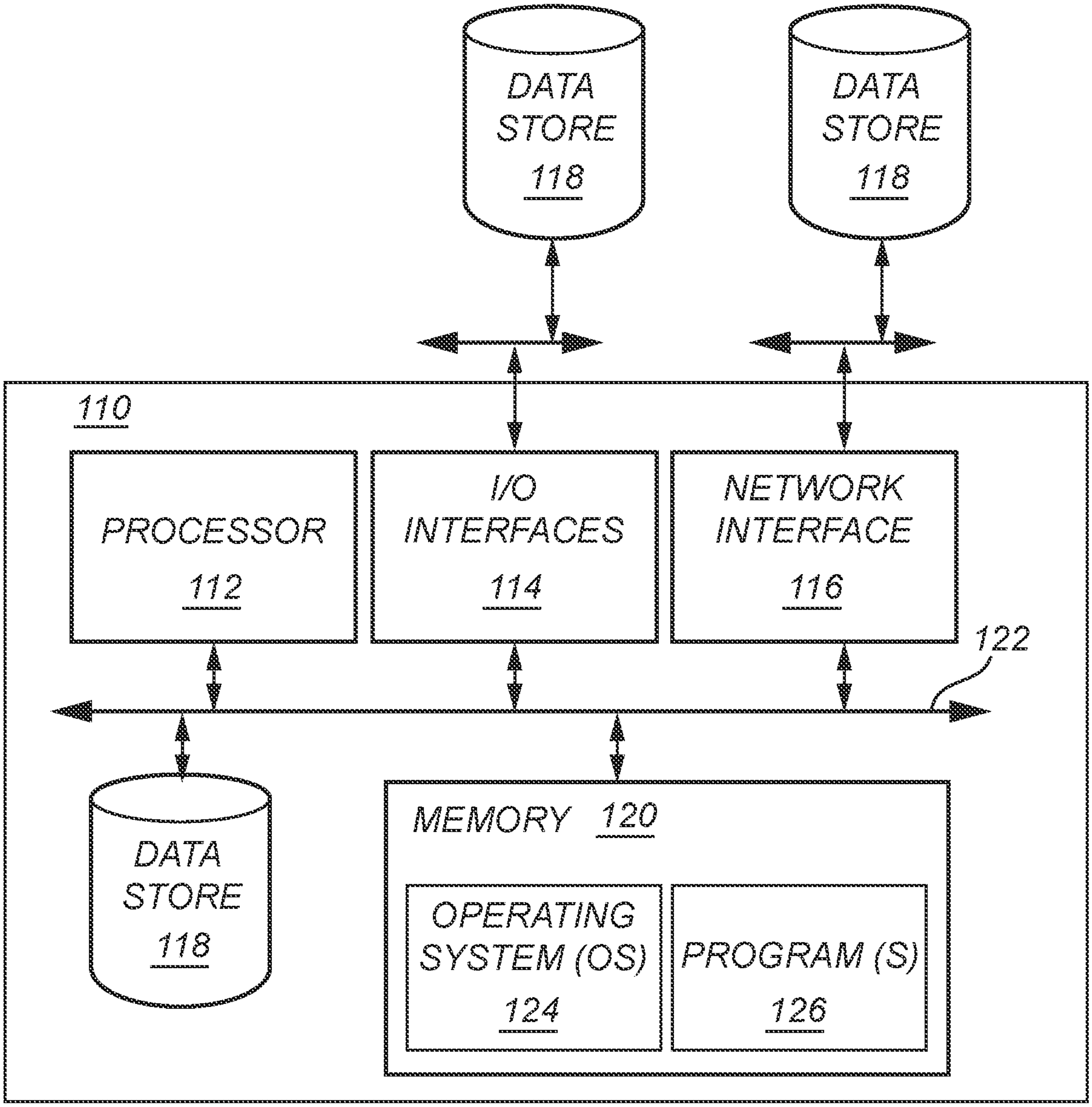
FIG. 10 is a block diagram of an illustrative controller of the sound system of FIG. 9.

Referring additionally to FIG. 10, in various embodiments the controller 110 includes a processor 112, I/O interfaces 114, network interfaces 116, a data store 118, memory 120, an OS 124, programs 126, and a local interface 122, which can be the same or similar to the processor 172, I/O interfaces 174, network interfaces 176, a data store 178, memory 180, an OS 184, programs 186, and a local interface 182 as described above with regards to the portable speaker 150.

In various embodiments, controller 110 is configured to control output of one or more of the light sources 163 and the speakers 188 of each of the portable speakers 150 connected thereto. In various embodiments, the controller 110 is configured to adjust and control sound emanating from any combination of docked portable speakers 150, undocked portable speakers 150, and permanent speakers to provide a blended stereo sound, surround sound, and the like. In various embodiments, the controller 110 is configured to determine a location of each of the portable speakers 150, such as by using radio signals to triangulate location, and to control the sound emanating from the portable speakers 150 based on the determined location(s) to provide a balance of the sound.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term processor, as used in the foregoing/following disclosure, may refer to a collection of one or more components (such as computer processors and their components) that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of processor (e.g., at a first time), as a second type of processor (e.g., at a second time, which may in some instances coincide with, overlap, or follow a first time), and/or as a third type of processor (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first processor that has a first purpose, then a second processor that has a second purpose and then, a third processor that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different component in as little as a few nanoseconds. A component may reconfigure on-the-fly, e.g., the reconfiguration of a component from a first component into a second component may occur just as the second component is needed. A component may reconfigure in stages, e.g., portions of a first component that are no longer needed may reconfigure into the second component even before the first component has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a component for displaying graphics on a screen, a component for writing data to a storage medium, a component for receiving user input, and a component for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components, the example includes the possibility that the same hardware may implement more than one of the recited components, either contemporaneously or at discrete times or timings. The implementation of multiple components, whether using more components, fewer components, or the same number of components as the number of components, is merely an implementation choice and does not generally affect the operation of the components themselves. Accordingly, it should be understood that any recitation of multiple discrete components in this disclosure includes implementations of those components as any number of underlying components, including, but not limited to, a single component that reconfigures itself over time to carry out the functions of multiple components, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like “responsive to,” “related to,” or other past-tense adjectives are generally not intended to exclude such variants, unless context dictates otherwise.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A portable speaker comprising:

a frame comprising a bottom portion adapted to support the frame in a predetermined orientation when the bottom portion is resting on a surface;

a speaker adapted to produce sound;

a light source adapted to emit light;

a reflector adapted to redirect at least a portion of the light to illuminate the surface when the bottom portion is resting on the surface and the frame is supported in the predetermined orientation; and a speaker grille, wherein the light source is positioned at one end of the speaker grille and the reflector is positioned adjacent to the speaker grille between the one end of the speaker grille and a bottom portion of the portable speaker.

2. The portable speaker of claim 1, wherein the surface comprises one or more ground surfaces.

3. The portable speaker of claim 1, wherein the light source and reflector are adapted to diffuse the light toward an area surrounding the frame.

4. The portable speaker of claim 1, wherein the light source includes an aperture adapted to focus the light towards the reflector.

5. The portable speaker of claim 1, wherein the frame includes a plurality of pillars that extend between a top portion and a bottom portion of the portable speaker, and the light source and the reflector each extend across a side of the portable speaker between two pillars of the plurality of pillars.

6. The portable speaker of claim 1, wherein the reflector includes a concave surface.

7. The portable speaker of claim 1, further comprising:

a latch adapted to secure the frame to a vehicle; and electrical contacts adapted to receive electricity from the vehicle to charge a battery of the portable speaker, wherein the latch is adapted to align the electrical contacts within the vehicle for the receipt of the electricity from the vehicle.

8. The portable speaker of claim 1, further comprising:

a processor; and memory storing computer-executable instructions, and in response to execution by the processor, the computer-executable instructions cause the processor to associate the portable speaker with a vehicle and to synchronize at least one of the sound produced by the speaker and the light emitted by the light source with sounds produced and lights emitted by other portable speakers associated with the vehicle.

9. A portable speaker comprising:

a bottom portion adapted to support a frame in a predetermined orientation on a surface;

a latch adapted to secure the frame to a vehicle;

a speaker adapted to produce sound;

a light source adapted to emit light;

a reflector adapted to redirect at least a portion of the light to illuminate the surface when the bottom portion is resting on the surface; and a plurality of sides, each including a speaker grille positioned between a top portion and the bottom portion of the portable speaker, wherein, each of the plurality of sides includes a respective light source positioned under an end of the speaker grille closest to the bottom portion and a respective reflector positioned adjacent to the speaker grille between the end of the speaker grille and the bottom portion.

10. The portable speaker of claim 9, wherein the frame includes a plurality of pillars that extend between a top portion and the bottom portion, the plurality of pillars defining edges of the frame and being adapted to ensure only one orientation of the frame is possible while inserting the frame into a dock of the vehicle.

11. The portable speaker of claim 10, further comprising electrical contacts adapted to engage the dock for receiving electricity from the vehicle to charge a battery of the portable speaker.

12. The portable speaker of claim 9, wherein the surface comprises one or more ground surfaces.

13. The portable speaker of claim 9, wherein the light source and reflector are adapted to diffuse the light toward an area surrounding the frame.

14. The portable speaker of claim 9, wherein the light source includes an aperture adapted to focus the light towards the reflector.

15. A vehicle comprising:

a vehicle body;

a vehicle cabin;

a portable speaker including:

a frame including a bottom portion adapted to support the frame in a predetermined orientation when the bottom portion is resting on a surface;

a latch adapted to secure the frame to the vehicle;

a speaker adapted to produce sound;

a light source adapted to emit light; and a reflector adapted to redirect at least a portion of the light to illuminate the surface when the bottom portion is resting on the surface and the frame is supported in the predetermined orientation; and a dock disposed in a location chosen from the vehicle body and the vehicle cabin, the dock being adapted to receive the portable speaker therein and secure the portable speaker thereto via the latch.

16. The vehicle of claim 15, wherein the frame includes a plurality of pillars that extend between a top portion and the bottom portion, the plurality of pillars defining edges of the frame and being adapted to ensure only one orientation of the frame is possible while inserting the frame into the dock.

17. The vehicle of claim 15, wherein the portable speaker includes electrical contacts and the dock is adapted to engage the electrical contacts and charge the portable speaker from electricity provided by the vehicle.

18. The vehicle of claim 15, further comprising a controller configured to synchronize the sound produced by the portable speaker with other speakers within the vehicle while the portable speaker is secured in the dock.

* * * * *